(12) United States Patent
Hirosawa

(10) Patent No.: US 9,677,303 B2
(45) Date of Patent: Jun. 13, 2017

(54) ATTACHMENT STRUCTURE FOR DOOR LOCK DEVICE

(71) Applicant: TOYOTA JIDOSHA KABUSHIKI KAISHA, Toyota-shi, Aichi-ken (JP)

(72) Inventor: Yasunori Hirosawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/003,060

(22) Filed: Jan. 21, 2016

(65) Prior Publication Data
US 2016/0215531 A1 Jul. 28, 2016

(30) Foreign Application Priority Data
Jan. 27, 2015 (JP) .................. 2015-013631

(51) Int. Cl.
*E05B 3/00* (2006.01)
*E05B 79/12* (2014.01)
*E05C 19/00* (2006.01)
*E05B 79/22* (2014.01)
*E05B 81/02* (2014.01)
(Continued)

(52) U.S. Cl.
CPC .................. *E05B 79/12* (2013.01); *B60J 5/04* (2013.01); *E05B 79/16* (2013.01); *E05B 79/22* (2013.01); *E05B 81/02* (2013.01); *E05C 19/00* (2013.01)

(58) Field of Classification Search
CPC .......... E05B 79/12; E05B 79/22; E05B 81/02; E05C 19/00
See application file for complete search history.

(56) References Cited

U.S. PATENT DOCUMENTS 4,381,656 A  5/1983 Hayakawa
6,805,398 B2  10/2004 Harima et al.
(Continued)

FOREIGN PATENT DOCUMENTS

FR   2 649 152 A1  1/1991
JP   2004-027563 A  1/2004
(Continued)

OTHER PUBLICATIONS

Jun. 13, 2016 Search Report issued in European Patent Application No. 16151981.4.

*Primary Examiner* — Kristina Fulton
*Assistant Examiner* — Thomas Neubauer
(74) *Attorney, Agent, or Firm* — Oliff PLC

(57) ABSTRACT

An attachment structure for a door lock device includes (1) a rod provided at an outer side section, that is disposed such that a length direction of the rod is in the vehicle vertical direction, and that is coupled to a door outer handle to move vertically upon operation of the door outer handle; (2) a releasing section provided at an inner side section, that includes a joining section to which the rod is joined from the vehicle width direction outside, and that releases a locked state of the door lock device upon vertical movement of the rod; (3) a restricting section provided at the outer side section, and that restricts movement of the rod toward the vehicle width direction outside and in the vehicle front-rear direction; and (4) a guiding section provided at the releasing section, and that guides the rod into the joining section.

5 Claims, 4 Drawing Sheets

(51) Int. Cl.
*B60J 5/04* (2006.01)
*E05B 79/16* (2014.01)

(56) References Cited

U.S. PATENT DOCUMENTS

| | | | |
|---|---|---|---|
| 8,360,486 B2 * | 1/2013 | Gschweng | E05B 17/0062 292/336.3 |
| 8,465,064 B2 * | 6/2013 | Ghannam | E05B 77/04 292/216 |
| 2003/0173796 A1 | 9/2003 | Harima et al. | |
| 2007/0029835 A1 | 2/2007 | Herline et al. | |
| 2007/0069525 A1 | 3/2007 | Ghannam | |
| 2011/0115252 A1 | 5/2011 | Higgins et al. | |
| 2014/0319847 A1 | 10/2014 | Uehara et al. | |
| 2015/0167360 A1 | 6/2015 | Chung | |

FOREIGN PATENT DOCUMENTS

| | | |
|---|---|---|
| JP | 2007-223410 A | 9/2007 |
| JP | 2011-106264 A | 6/2011 |
| JP | 2013-238003 A | 11/2013 |
| JP | 2014-136945 A | 7/2014 |

* cited by examiner

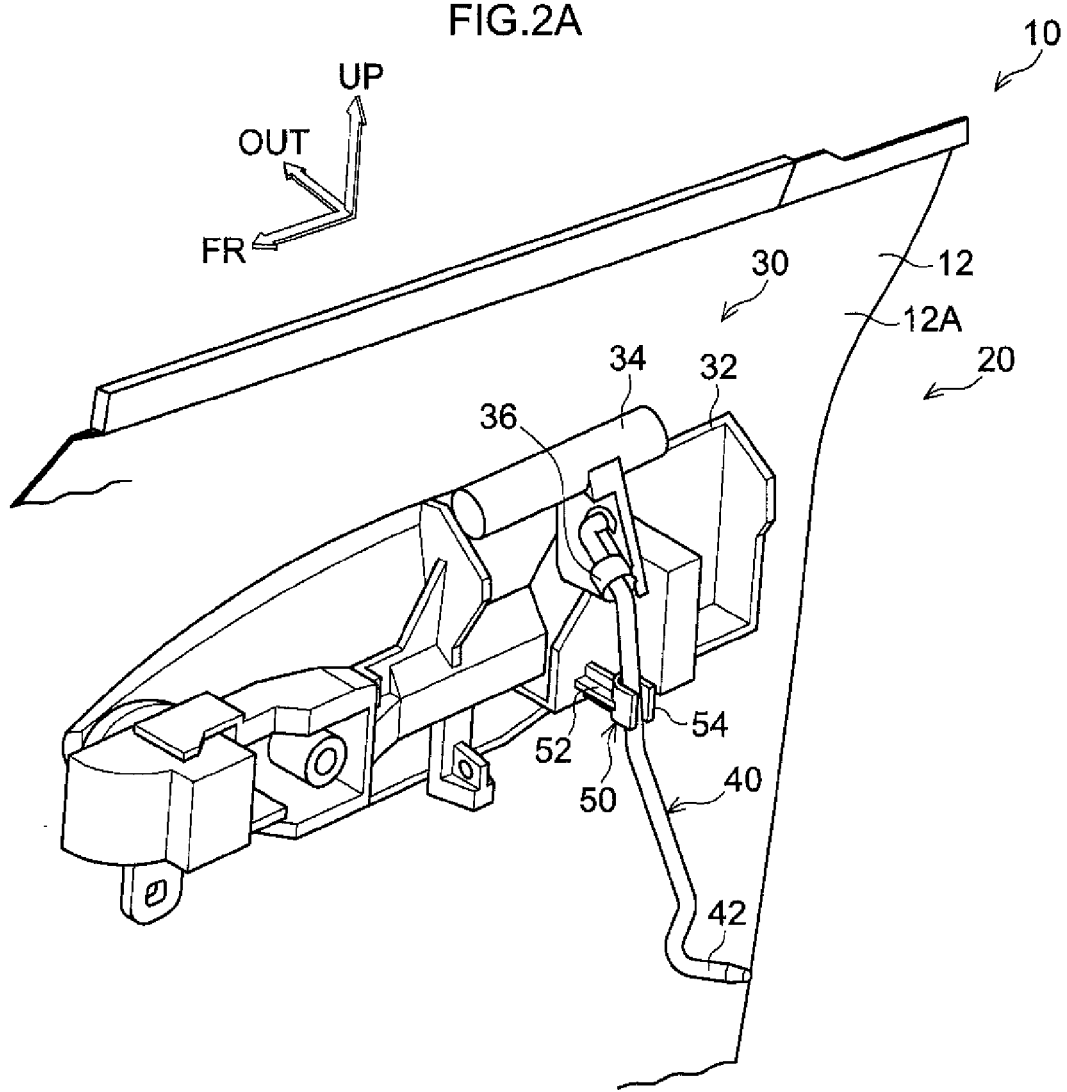
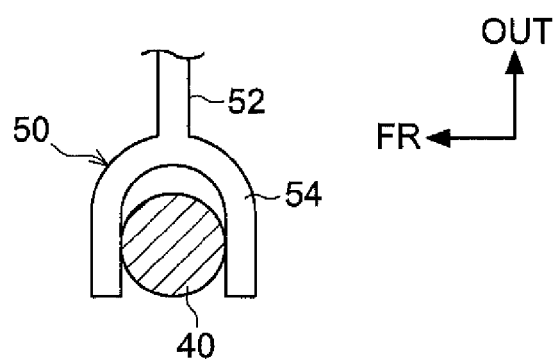

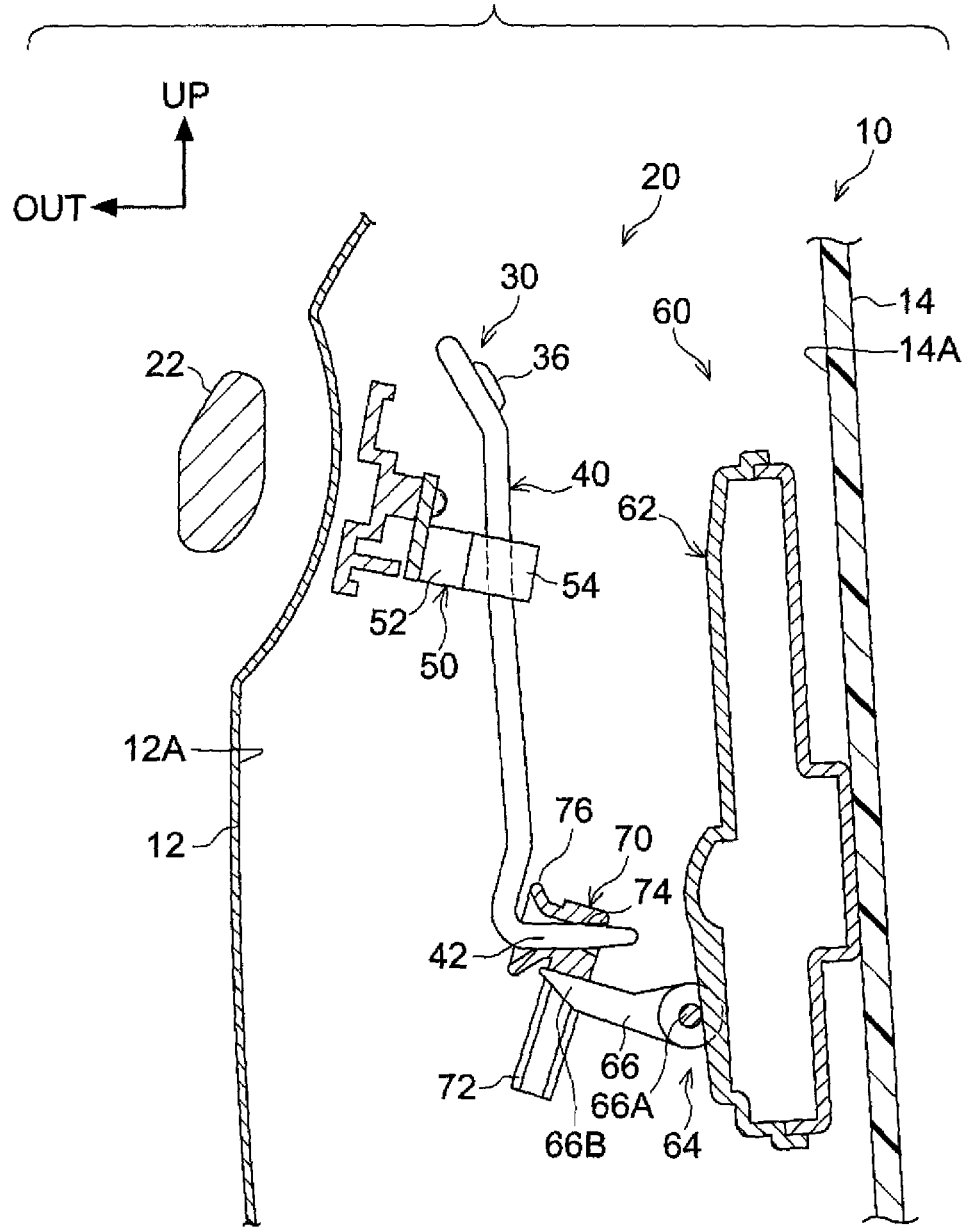

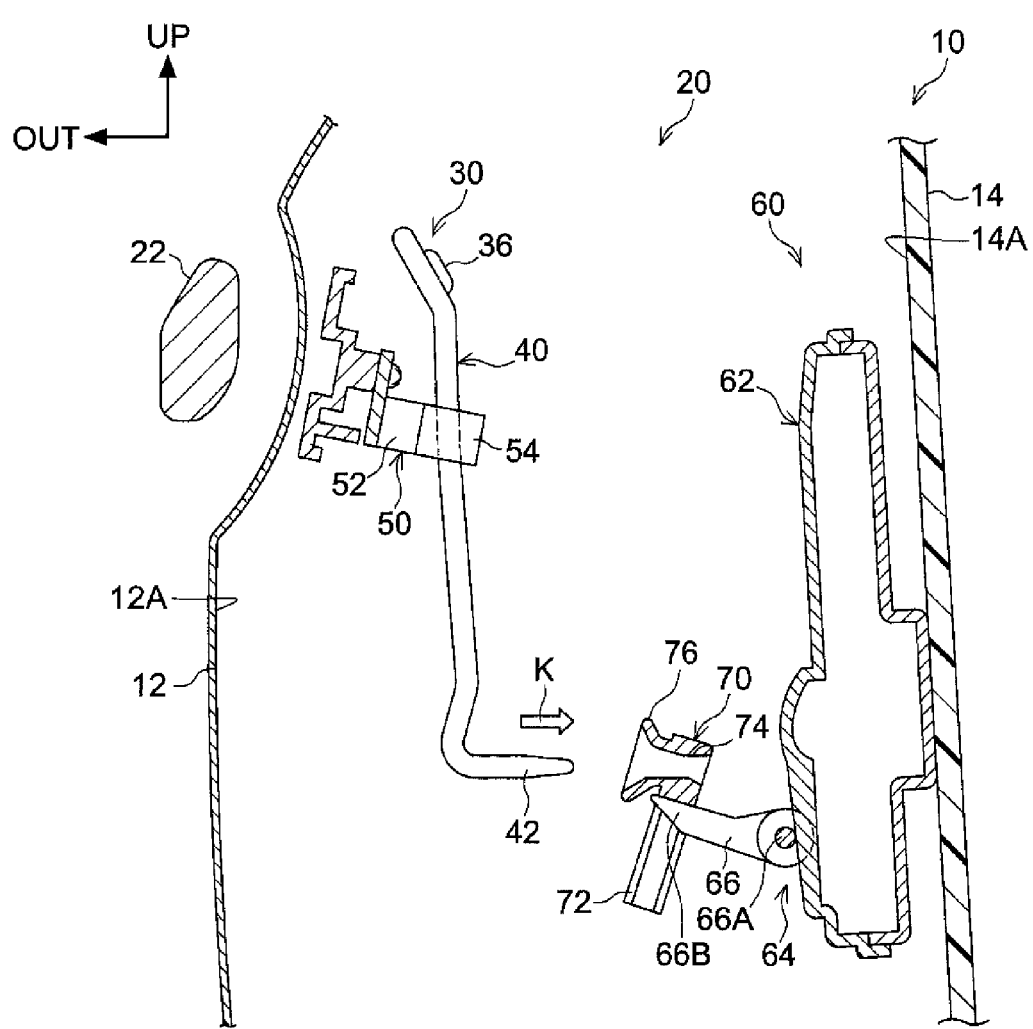

ATTACHMENT STRUCTURE FOR DOOR LOCK DEVICE

CROSS-REFERENCE TO RELATED APPLICATION

This application claims priority under 35 USC 119 from Japanese Patent application No, 2015-013631 filed on Jan. 27, 2015, the disclosure of which is incorporated by reference herein in its entirety.

BACKGROUND

Technical Field

The present disclosure relates to an attachment structure for a door lock device, Related Art A door lock device provided inside a vehicle door, and attached through an opening portion (a service hole) formed in a door inner panel is known.

For example, Japanese Patent Application Laid-Open (JP-A) No. 2007-223410 describes an attachment method for a door lock device in which a lock device is attached to the inside of a door inner panel after an end portion of a lock cable is pulled out through an opening portion in the inner panel toward the vehicle cabin inside and joined to the lock device.

However, providing an opening portion (service hole) to a door inner panel lowers the strength of the door inner panel by a corresponding amount. It is therefore preferable not to provide an opening portion for the attachment operation of attaching the lock device to the door inner panel, from the viewpoint of strength of the door inner panel.

On the other hand, from the viewpoint of work efficiency, there is demand for attachment of the door lock device inside the vehicle door to be easy.

Another related technology is described by JP-A No. 2013-238003.

SUMMARY

In consideration of the above, the present disclosure provides an attachment structure for a door lock device that enables the door lock device to be easily attached inside a vehicle door, without providing an opening portion to a door inner panel for an attachment operation of attaching the door lock device to the door inner panel.

A first aspect of the present disclosure is an attachment structure including (1) a door lock device including an outer side section attached to a vehicle width direction inside face of a door outer panel that forms an outer plate of a vehicle door, and an inner side section attached to a vehicle width direction outside face of a door inner panel, the door inner panel being joined to the vehicle width direction inside of the door outer panel to form the vehicle door; (2) a rod provided at the outer side section, the rod being disposed such that a length direction of the rod is in a vehicle vertical direction, the rod being coupled to a door outer handle and moving vertically upon operation of the door outer handle; (3) a releasing section provided at the inner side section, the releasing section including a joining section to which the rod is joined from the vehicle width direction outside, the releasing section releasing a locked state of the door lock device upon vertical movement of the rod; (4) a restricting section provided at the outer side section, the restricting section restricting movement of the rod toward the vehicle width direction outside and in the vehicle front-rear direction; and (5) a guiding section provided at the releasing section, the guiding section guiding the rod to the joining section when the outer side section and the inner side section are brought together and attached to each other during assembly of the vehicle door.

In the attachment structure of the first aspect described above, joining the door outer panel and the door inner panel together produces a door lock device in which the rod of the outer side section attached to the vehicle width direction inside face of the door outer panel is joined to, and integrated together with, the joining section of the releasing section of the inner side section attached to the vehicle width direction outside face of the door inner panel from the vehicle width direction outside.

Movement of the rod of the outer side section toward the vehicle width direction outside and in the vehicle front-rear direction is restricted by the restricting section. Hence the restricting section restricts movement of the rod during an operation to join the door outer panel to the door inner panel, thereby suppressing misalignment of the rod with respect to the joining section of the releasing section. Moreover, the guiding section guides the rod into engagement with the joining section of the releasing section. The rod and the releasing section are therefore easily joined together when joining the door outer panel to the door inner panel.

The door locking device is attached inside the vehicle door by joining the door outer panel to the door inner panel in this manner. Accordingly, the door lock device is easily attached inside the vehicle door without providing an opening portion in the door inner panel for an attachment operation of attaching the door lock device to the door inner panel.

A second aspect of the present disclosure is the attachment structure of the first aspect, wherein the door inner panel is configured by fiber reinforced resin.

In the attachment structure of the second aspect described above, no opening is provided in the fiber reinforced resin door inner panel for an attachment operation of attaching the door lock device to the door inner panel formed by fiber reinforced resin. The strength of the door inner panel formed by fiber reinforced resin is therefore enhanced compared to cases in which an opening is provided in the door inner panel for an attachment operation.

A third aspect of the present disclosure is the attachment structure of the first aspect or the second aspect, wherein the restricting section includes a U-shaped section having an opening side at the vehicle width direction inside in plan view, into which an intermediate portion of the rod is inserted.

In the attachment structure of the third aspect described above, inserting the intermediate portion of the rod into the U-shaped section that has the open side at the vehicle width direction inside restricts movement of the of the rod toward the vehicle width direction outside and in the vehicle front-rear direction without restricting vertical movement of the rod.

A fourth aspect of the present disclosure is the attachment structure of any one of the first aspect to the third aspect, wherein: the rod includes a protruding portion that protrudes toward the vehicle width direction inside, the protruding portion being provided at a lower end portion of the rod; the joining section includes an opening into which the protruding portion is inserted from the vehicle width direction outside; and the guiding section is provided at the vehicle width direction outside of the opening, the guiding section having an increasing diameter that increases in diameter on progression toward the vehicle width direction outside.

In the attachment structure of the fourth aspect described above, the protruding portion of the rod is inserted into the insertion section of the releasing section, guided by the increasing diameter, even in a state in which the protruding portion of the rod is misaligned with the opening of the releasing section.

According to the first aspect above, the door lock device can easily be attached inside the vehicle door without providing an opening in the door inner panel for an attachment operation of attaching the door lock device to the door inner panel.

According to the second aspect above, the strength of the door inner panel formed by fiber reinforced resin can be enhanced compared to cases in which an opening is provided in the door inner panel for an attachment operation.

According to the third aspect above, movement of the rod toward the vehicle width direction outside and in the vehicle front-rear direction can be restricted without restricting vertical movement of the rod.

According to the fourth aspect above, the rod can be easily joined to the joining section.

BRIEF DESCRIPTION OF THE DRAWINGS

Exemplary embodiments of the present disclosure will be described in detail based on the following figures, wherein:

FIG. 2A is a perspective view illustrating an outer side device section in a state of attachment to a door outer panel of a side door;

FIG. 2B is a plan view schematically illustrating an opening rod support and a rod that configure an outer side device section;

FIG. 3 is a cross-section illustrating a state cut away along the line 3-3 in FIG. 1 of a side door in which a door lock device is assembled; and FIG. 4 is a cross-section corresponding to FIG. 3 illustrating a state before joining together a door outer panel and a door inner panel of a side door.

DETAILED DESCRIPTION

Figure 1:
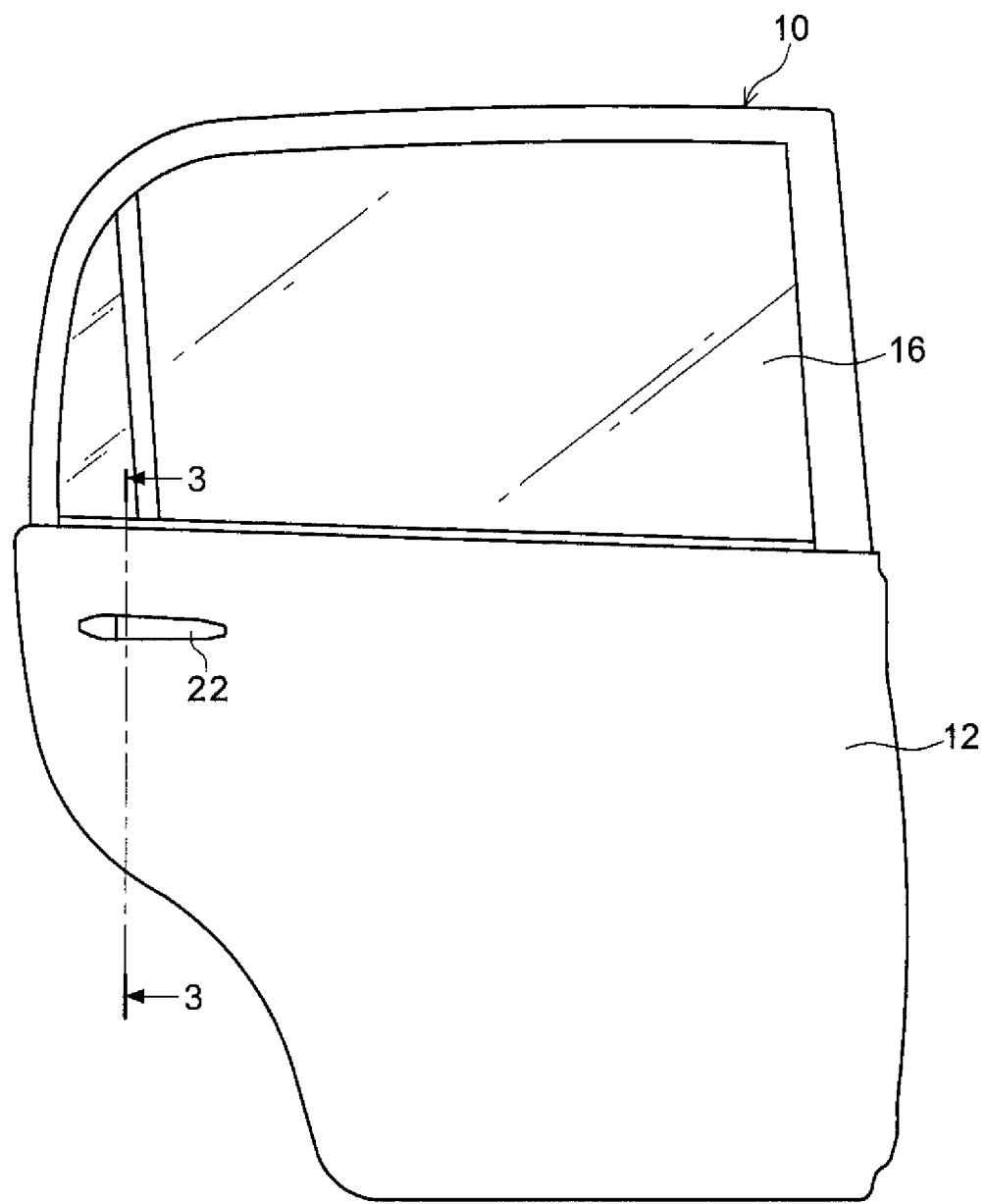
FIG. 1 is a side view illustrating a side door applied with an attachment structure for a door lock device according to a first exemplary embodiment of the present disclosure.

Explanation follows regarding a side door 10 applied with an attachment structure for a door lock device according to a first exemplary embodiment of the present disclosure, with reference to FIG. 1 to FIG. 4. Note that the arrow FR indicates the vehicle front-rear direction front side, the arrow UP indicates the vehicle vertical direction upper side, and the arrow OUT indicates the vehicle width direction outside in the drawings where appropriate.

Explanation first follows regarding the structure of the side door 10.

The side door 10, serving as an example of a vehicle door, illustrated in FIG. 1 to FIG. 3 opens and closes a door opening portion formed at a vehicle side section, not illustrated in the drawings. A door lock device 20 (see FIG. 3) provided at the side door 10 is thereby configured to maintain a closed state of the side door 10, namely, a door locked state.

As illustrated in FIG. 3, the side door 10 illustrated in FIG. 1 includes a door outer panel 12 that configures a door outer plate disposed at the vehicle width direction outside, and a door inner panel 14 that configures a door inner plate disposed at the vehicle width direction inside. In the present exemplary embodiment, the door outer panel 12 is configured by sheet metal, and the door inner panel 14 is configured by fiber reinforced resin. Moreover, the door outer panel 12 and the door inner panel 14 face each other in the vehicle width direction, and their peripheral edge portions are joined together by fastening with bolts.

As illustrated in FIG. 3, the door lock device 20 is installed inside the side door 10 (between the door outer panel 12 and the door inner panel 14) together with door glass 16 (see FIG. 1), a door glass raising/lowering device (a window regulator) that raises or lowers the door glass 16, and the like.

As illustrated in FIG. 1, a door outside handle 22 is provided on a lower side of a belt line at the vehicle width direction outside of the door outer panel 12 of the side door 10 (see also FIG. 3). The door outside handle 22 is supported so as to be capable of swinging in the vehicle width direction. The door lock of the side door 10 is released, and the side door 10 is opened, by swinging the door outside handle 22 toward the vehicle width direction outside.

As illustrated in FIG. 3, the door lock device 20 includes an outer side device section 30 and an inner side device section 60. The outer side device section 30 is attached to a vehicle width direction inside face 12A of the door outer panel 12, and the inner side device section 60 is attached to a vehicle width direction outside face 14A of the door inner panel 14.

As illustrated in FIG. 2A, the outer side device section 30 that configures the door lock device 20 includes the door outside handle 22 (see FIG. 1 and FIG. 3), a door handle base 32, a bell crank 34, a snap fixing 36, an opening rod 40, an opening rod support 50, and the like. Note that the door handle base 32, the bell crank 34, the snap fixing 36, etc. are illustrated schematically.

The door handle base 32 is fixed to the vehicle width direction inside face 12A of the door outer panel 12, and the bell crank 34 is supported by the door handle base 32. Moreover, the snap fixing 36 is provided at the bell crank 34, and the opening rod 40 is attached to the bell crank 34 by the snap fixing 36.

As illustrated in FIG. 2A and FIG. 3, the opening rod 40 is disposed with its length direction in the vehicle vertical direction, and a protruding portion 42 is formed protruding toward the vehicle width direction inside due to a lower end portion of the opening rod 40 being bent toward the vehicle width direction inside. The opening rod 40 is thereby formed in an L shape as viewed along the vehicle front-rear direction.

The opening rod 40 is configured so as to move vertically interlocked to operation of the door outside handle 22 (see FIG. 1 and FIG. 3). More specifically, the opening rod 40 is moved down by the bell crank 34 and the snap fixing 36 when the door outside handle 22 (see FIG. 1 and FIG. 3) is pulled toward the vehicle width direction outside.

As illustrated in FIG. 2A and FIG. 2B, the opening rod support 50 is configured by a shaft portion 52 protruding toward the vehicle width direction inside, and a U-shaped portion 54 serving as a restricting section. The U-shaped portion 54 is formed in a U-shape with the open side at the vehicle width direction inside in plan view. An intermediate portion of the opening rod 40 is inserted into the U-shaped portion 54 of the opening rod support 50. The U-shaped portion 54 thus allows the opening rod 40 to move vertically, but restricts the opening rod 40 from moving toward the vehicle width direction outside and in the vehicle front-rear direction.

As illustrated in FIG. 3, the inner side device section 60 that configures the door lock device 20 includes a device main body 62 that incorporates a releasing section 64, and the device main body 62 is fixed to a vehicle width direction outside face 14A of the door inner panel 14.

The releasing section 64 incorporated in the device main body 62 includes an opening lever 66. The opening lever 66 extends toward the vehicle width direction outside, and is configured so as to rotate in the vehicle vertical direction around a rotation shaft 66A, provided at a vehicle width direction inside end portion of the opening lever 66, serving as the rotation axis. The releasing section 64 is configured such that the door lock is released by rotationally moving the opening lever 66 downward.

An attachment 70 is attached to a vehicle width direction outside end portion 66B of the opening lever 66. The attachment 70 includes an attachment section 72 disposed with its length direction in the vehicle vertical direction, and the end portion 66B of the opening lever 66 is inserted into the attachment section 72.

The protruding portion 42 of the opening rod 40, described above, is inserted into an upper end portion of the attachment section 72 of the attachment 70, penetrating the attachment 70 in the vehicle width direction. An insertion section 74 is provided to serve as a joining section. Moreover, an insertion guiding section 76 is formed at the vehicle width direction outside of the insertion section 74, increasing in diameter on progression toward the vehicle width direction outside, and serves as a guiding section or an increasing diameter section.

According to this configuration, in the door lock device 20 illustrated in FIG. 2A and FIG. 3, the opening rod 40 is displaced downward when the door outside handle 22 (see FIG. 1 and FIG. 3) is pulled toward the vehicle width direction outside. Displacing the opening rod 40 downward causes the protruding portion 42 of the opening rod 40 to rotate the opening lever 66 downward through the attachment 70 inserted into the insertion section 74, and the door lock to release.

Explanation next follows regarding operation of the present exemplary embodiment.

First, explanation follows regarding an assembly process for the side door 10. As illustrated in FIG. 4, the outer side device section 30 that configures the door lock device 20 is attached to the vehicle width direction inside face 12A of the door outer panel 12, and the inner side device section 60 that configures the door lock device 20 is attached to the vehicle width direction outside face 14A of the door inner panel 14.

The door outer panel 12 and the door inner panel 14 are joined together by making the door outer panel 12 and the door inner panel 14 face each other in the vehicle width direction, and then fastening the peripheral edge portions thereof together using bolts.

The outer side device section 30 and the inner side device section 60 are joined together in the vehicle width direction and integrated together as illustrated in FIG. 3, and the door lock device 20 is assembled, by inserting the protruding portion 42 of the opening rod 40 of the outer side device section 30 into the insertion section 74 of the attachment 70 attached to the opening lever 66 of the inner side device section 60 as indicated by arrow K in FIG. 4.

At this time, as illustrated in FIG. 2, the opening rod 40 is inserted into the U-shaped portion 54 of the opening rod support 50, and movement of the opening rod 40 toward the vehicle width direction outside and in the vehicle front-rear direction is restricted. In the assembly process that joins the door outer panel 12 to the door inner panel 14, movement (swaying) of the opening rod 40 is accordingly restricted (suppressed), and the protruding portion 42 of the opening rod 40 is prevented from being greatly misaligned with the insertion section 74 of the attachment 70.

The insertion guiding section 76 that increases in diameter on progression toward the vehicle width direction outside is formed at the vehicle width direction outside of the insertion section 74. The protruding portion 42 is accordingly guided by the insertion guiding section 76 when inserted into the insertion section 74, even if there is some misalignment of the protruding portion 42 of the opening rod 40 with respect to the insertion section 74.

The outer side device section 30 and the inner side device section 60 are thereby joined together in the vehicle width direction and integrated together, and the door lock device 20 is assembled, by joining together the peripheral edge portions of the door outer panel 12 and the door inner panel 14 by fastening bolts.

Namely, the door lock device 20 can be easily attached inside the side door 10, without providing an opening portion for an attachment operation of attaching the door lock device 20 to the door inner panel 14. Moreover, the door lock device 20 can be easily attached inside the side door 10, even in cases in which it is difficult to provide an opening portion for an attachment operation of attaching the door lock device 20 to the door inner panel 14.

Further, the strength of the door inner panel 14 configured from fiber reinforced resin is enhanced due to the door inner panel 14 not having an opening portion for an attachment operation of attaching the door lock device 20. Moreover, the strength of the door inner panel 14 can easily be secured, even when the door inner panel 14 is made of fiber reinforced resin.

Moreover, the opening rod 40 is inserted into the U-shaped portion 54 of the opening rod support 50, and movement of the opening rod 40 toward the vehicle width direction outside and in the vehicle front-rear direction is restricted. This prevents the opening rod 40 from separating due to, for example, impact during a vehicle collision. Namely, the opening rod support 50 has two functions: a function of facilitating attachment of the door lock device 20, and a function of preventing separation of the opening rod 40.

The present disclosure is not limited to the exemplary embodiment described above.

For example, although the leading end portion of the opening rod support 50 is the U-shaped portion 54 in the exemplary embodiment above, there is no limitation thereto. The leading end portion may be a ring shaped member into which the opening rod 40 is inserted.

Moreover, although the door outer panel 12 is configured from sheet metal and the door inner panel 14 is configured from a fiber reinforced resin in the present exemplary embodiment, there is no limitation thereto. For example, the door outer panel and the door inner panel may both be sheet metal. Moreover, the door outer panel and the door inner panel may be joined together by a method other than fastening bolts.

Various modifications can be implemented without departing from the spirit of the present disclosure.

What is claimed is:
1. An attachment structure comprising:
    a vehicle door including (i) a door outer panel that forms an outer surface of the vehicle door, and (ii) a door inner panel joined to a vehicle width direction inside of the door outer panel to form the vehicle door;
    a door lock device including an outer side section attached to a vehicle width direction inside face of the door outer panel, and an inner side section attached to a vehicle width direction outside face of the door inner panel;

a rod provided at the outer side section, the rod being disposed such that a length direction of the rod is in a vehicle vertical direction, the rod being coupled to a door outer handle and moving vertically upon operation of the door outer handle, a lower portion of the rod including a bend so that a lower end of the rod includes a protruding portion that protrudes laterally in the vehicle width direction toward an interior of the vehicle;

a releasing section provided at the inner side section, the releasing section including a joining section to which the rod is joined from the vehicle width direction outside, the joining section including a passage through which the protruding portion of the rod is slidably inserted from the vehicle width direction outside, the passage extending entirely through the joining section, the protruding portion extending through the passage so that an end of the protruding portion extends outside of the passage, the releasing section releasing a locked state of the door lock device upon vertical movement of the rod;

a restricting section provided at the outer side section, the restricting section having a first surface located between the door outer panel and the rod and restricting movement of the rod toward the vehicle width direction outside and away from the joining section and having second surfaces restricting movement of the rod in the vehicle front-rear direction; and a guiding section provided at the releasing section, the guiding section being an outwardly tapered extension of the joining section and being provided at the vehicle width direction outside of the joining section, the guiding section having an outer diameter and including an extension of the passage that defines an inner diameter, the inner and outer diameters of the guiding section increasing on progression of the guiding section toward the vehicle width direction outside so that the extension of the passage guides the protruding portion of the rod into the passage of the joining section when the outer side section and the inner side section are brought together and attached to each other during assembly of the vehicle door.

2. The attachment structure of claim 1, wherein the door inner panel is constructed of fiber reinforced resin.

3. The attachment structure of claim 1, wherein the restricting section includes a U-shaped section having an opening side at the vehicle width direction inside in plan view, into which an intermediate portion of the rod is inserted.

4. An attachment structure comprising:

a door lock device including an outer side section configured to be attached to a vehicle width direction inside face of a door outer panel that forms an outer surface of a vehicle door, and an inner side section configured to be attached to a vehicle width direction outside face of a door inner panel that forms an inner surface of the vehicle door;

a rod provided at the outer side section, the rod extending in a vehicle vertical direction, an upper end portion of the rod being coupled to a door outer handle, the rod moving vertically upon operation of the door outer handle, a lower end portion of the rod including a bend so that a first end of the rod protrudes laterally in the vehicle width direction toward an interior of the vehicle;

a releasing lever provided at the inner side section, the releasing lever attached to a joining section having a passage through which the first end of the rod is slidably inserted from the vehicle width direction outside, the passage extending entirely through the joining section, the first end of the rod extending through the passage so that a tip of the first end of the rod extends outside of the passage, the releasing lever releasing a locked state of the door lock device upon vertical movement of the rod;

a restraint provided at the outer side section, the restraint having a first surface located on the vehicle width direction outside of the rod to restrict movement of the rod toward the vehicle width direction outside and away from the joining section, and the restraint having second and third surfaces located respectively on the vehicle front and vehicle rear sides of the rod to restrict movement of the rod in the vehicle front-rear direction; and a guide provided at the joining section, the guide being an outwardly tapered extension of the joining section and being provided at the vehicle width direction outside of the joining section, the guide having an outer diameter and including an extension of the passage that defines an inner diameter, the inner and outer diameters of the guide increasing on progression of the guide toward the vehicle width direction outside so that the extension of the passage guides the first end of the rod into the passage of the joining section when the outer side section and the inner side section are brought together and attached to each other during assembly of the vehicle door.

5. The attachment structure of claim 4, wherein the restraint includes a U-shaped member having the first, second and third surfaces, an intermediate portion of the rod being inserted into the U-shaped member.

* * * * *